US010217000B2

(12) United States Patent
Hardee et al.

(10) Patent No.: US 10,217,000 B2
(45) Date of Patent: Feb. 26, 2019

(54) CONTEXT-BASED EXTRACTION AND INFORMATION OVERLAY FOR PHOTOGRAPHIC IMAGES

(71) Applicant: INTERNATIONAL BUSINESS MACHINES CORPORATION, Armonk, NY (US)

(72) Inventors: Christopher J. Hardee, Raleigh, NC (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/407,484

(22) Filed: Jan. 17, 2017

(65) Prior Publication Data

US 2018/0204063 A1    Jul. 19, 2018

(51) Int. Cl.
*G06K 9/00*    (2006.01)
*G06T 11/60*    (2006.01)
*G06Q 50/00*    (2012.01)

(52) U.S. Cl.
CPC ..... *G06K 9/00697* (2013.01); *G06K 9/00671* (2013.01); *G06K 9/00677* (2013.01); *G06T 11/60* (2013.01); *G06Q 50/01* (2013.01)

(58) Field of Classification Search
None
See application file for complete search history.

(56) References Cited

U.S. PATENT DOCUMENTS

| 8,504,945 | B2 | 8/2013 | Jakobson et al. | |
| 9,032,000 | B2 | 5/2015 | Barrington et al. | |
| 9,349,147 | B2 | 5/2016 | Marra et al. | |
| 2004/0217884 | A1* | 11/2004 | Samadani | G01C 7/00 340/995.14 |
| 2006/0026170 | A1* | 2/2006 | Kreitler | G06F 17/30241 |
| 2007/0139546 | A1* | 6/2007 | Baiping | G06F 17/30265 348/333.01 |
| 2009/0115862 | A1* | 5/2009 | Andersson | G09B 29/106 348/222.1 |
| 2011/0317022 | A1* | 12/2011 | Cao | H04N 5/232 348/207.11 |
| 2012/0229657 | A1* | 9/2012 | Calman | G06Q 50/01 348/207.1 |

(Continued)

*Primary Examiner* — Ryan P Potts
(74) *Attorney, Agent, or Firm* — Cantor Colburn LLP; Kurt Goudy (57) ABSTRACT

An example method for extracting information from images published to a network site includes generating a knowledge base of stored activity related image objects from the published images, wherein each activity related image object is indicative of an activity, and wherein each activity related image object is associated with an image location of the published images; performing a contextual analysis of a new image published to the network site to identify a new activity, to determine an activity position of the activity, and to determine a new image location; identifying a stored activity related image object from the knowledge base as relating to the new image location based on the image location of the published images; and overlaying an indicium of the stored activity related image object identified as relating to the image location of the new image on the new image.

18 Claims, 5 Drawing Sheets

(56) References Cited

U.S. PATENT DOCUMENTS

| | | | |
|---|---|---|---|
| 2012/0236029 A1* | 9/2012 | Newhouse | H04N 21/41407 345/633 |
| 2013/0198176 A1* | 8/2013 | Kim | G06F 17/30277 707/724 |
| 2014/0040774 A1* | 2/2014 | Charytoniuk | G06F 17/30268 715/753 |
| 2014/0317511 A1 | 10/2014 | Bailiang et al. | |
| 2015/0058345 A1* | 2/2015 | Mishra | G06F 17/30241 707/737 |
| 2015/0271645 A1* | 9/2015 | Wyatt | H04W 4/029 455/456.2 |

* cited by examiner

CONTEXT-BASED EXTRACTION AND INFORMATION OVERLAY FOR PHOTOGRAPHIC IMAGES

BACKGROUND

The present disclosure relates to techniques for extracting context-based activities from photographic images and overlaying information on the images.

Digital photographs (i.e., images or image data) may be published through a network such as a social network site. These images may be related to travel or other activities of the user and may be visible to other social network friends of the user or to other users. The friends or other users can provide comments, likes, feedback, etc. on the images. In some cases, a friend or other user might also have traveled to a particular place or partaken in a particular activity illustrated in an image, and the friend or other user may publish similar images of the places and/or activities in the social network site.

SUMMARY

According to examples of the present disclosure, techniques including methods, systems, and/or computer program products for organizing information of a plurality of images published to a network site are provided. An example method includes generating, by a processor, a knowledge base of stored activity related image objects from the plurality of published images, wherein each activity related image object is indicative of an activity, and wherein each activity related image object is associated with an image location of the plurality of published images. The example method further includes performing a contextual analysis of a new image published to the network site to identify a new activity, determine an activity position of the activity in the new image, and determine a new image location of the new image. The example method further includes identifying at least one stored activity related image object from the knowledge base as relating to the new image location based on the image location of the plurality of published images. The example method further includes overlaying, by the processor, an indicium of the at least one stored activity related image object identified as relating to the image location of the new image on the new image.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Individuals use social network sites to post, publish, and/or share information with friends. The information can include, for example, photographic images (or image data) related to a person's travel. Friends can use the social network site to post comments on the shared information. In some instances, friends travel to the same places and publish similar images of the places through a social network site. Although social network sites provide a general communication path for friends to share their common travel experiences through images, the mechanisms for organizing and viewing such images typically involve some form of sequentially viewing each image individually.

Turning now to an overview of aspects of the present invention, embodiments described herein provide improved mechanisms for organizing and viewing images that come from different sources (e.g., friends on a social network site) but involve common themes or common context (e.g., photographic images taken near the Washington Monument). Embodiments of the invention extract context based activities/information from images (or image data) and organize the context based activities/information in an easily viewable format such as a graph or a map. For example, if the context extracted from several images is various locations in Time Square in New York City, a map of Times Square could be generated, and the specific context of each image could be represented by an indicator on the map. The indicator would serve as a link that could be clicked to provide a pop-up or a new window that provides additional information related to that image and its context, including, for example, the image itself, the names of the people in the image, social media comments on the image, etc.

In some embodiments of the present invention, the processor system of a social network server is configured to perform a method that includes identifying various images published on the social network site. The method extracts different "activity related image objects" from the images. For example, the activity related image objects could be boating, walking, driving, having tea, etc. The method creates a correlation among the identified actions and images.

The method also performs contextual analysis of the descriptions, comments from the user, user's friends, etc. Thus, various activities are associated with the image through contextual analysis of the text contents. Additionally, contextual analysis is performed on the images to determine the approximate position of the action in the image.

When a new image is published on the social network site, the method identifies the field of view and location where the image was captured. Accordingly, the method identifies various stored actions associated to the location where the image was captured, and then appropriate image objects are overlaid over the approximate location where the image was captured.

In some embodiments, the method uses images from others in a social network to add points of interest (POI) along navigation routes. The method can be configured to make the POI appear on a displayed map if any friend in the social network drives a route that pass nearby the POI.

In some embodiments, the method creates a displayed map having overlaid objects with hotspots that link to the images and additional information about the image object. In some embodiments, the method overlays animated objects over an image to explain the sequence of activities that any friend associated with that image has performed. For example, an animated overlay can be provided in any place where one friend enjoyed boating and then paragliding. Once any user opens the image, the image object related to boating is shown and the image related to paragliding is overlaid.

Example embodiments of the disclosure include or yield various technical features, technical effects, and/or improvements to technology. Example embodiments of the disclosure provide image and activity recognition to overlay information about an activity on an image by generating a knowledge base of stored activity related image objects, performing contextual analyses of a new image to determine an activity and image location, identifying a stored activity related image object from the knowledgebase that relates to the new image, and overlaying an indicium of the stored activity related image object that relates to the new activity on the new image. These aspects of the disclosure constitute technical features that yield the technical effect of overlaying information on an image that pertains to an activity associated with that image and/or location. As a result of these technical features and technical effects, the image extraction and overlay techniques in accordance with example embodiments of the disclosure represent an improvement to technologies. It should be appreciated that the above examples of technical features, technical effects, and improvements to technology of example embodiments of the disclosure are merely illustrative and not exhaustive.

Figure 1:
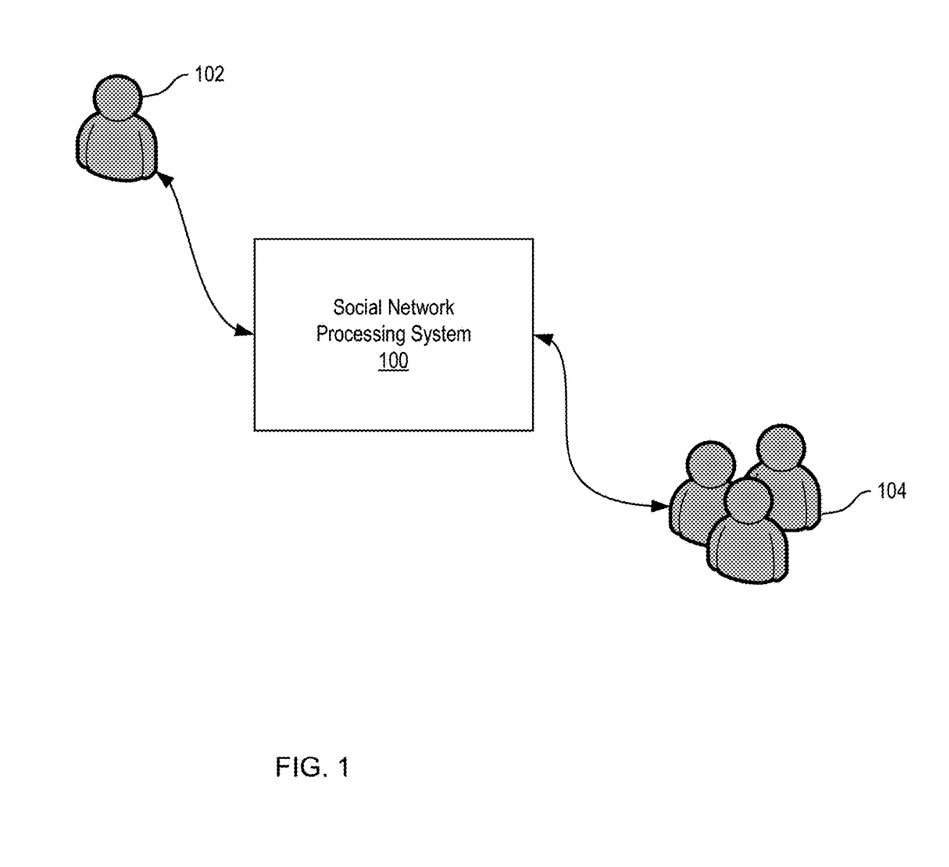
FIG. 1 illustrates a block diagram of a social network processing system for context-based extraction and information overlay for images according to examples of the present disclosure.

Turning now to a more detailed description of aspects of the present invention, FIG. 1 illustrates a block diagram of a social network processing system 100 for context-based extraction and information overlay for images according to examples of the present disclosure. The various components, modules, engines, etc. described regarding FIG. 1 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processing device for executing those instructions. Thus a system memory can store program instructions that when executed by a processing device implement the engines described herein. Other engines may also be utilized to include other features and functionality described in other examples herein.

Alternatively or additionally, the social network processing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. It should be appreciated that the social network processing system 100 may be part of, associated with, or separate from a social network site (e.g., Facebook®, MySpace®, Instagram®, LinkedIn®, etc.).

In particular, the social network processing system 100 identifies various images published on a social network site and then extracts different activity related image objects from those images. For example activity related image objects may include boating, taking a photographic image, walking, driving, having tea, etc. In examples, the image objects may be other than activity related (i.e., a restaurant, a park, a monument, etc.). The social network processing system 100 creates a correlation among the identified activity related image objects and a location associated with the image.

The social network processing system 100 also performs contextual analysis of descriptions, comments from users 104, descriptions from the uploading user 102, etc. and identifies the various activities associated with the image from contextual analysis of the text contents (e.g., descriptions, comments, etc.). The social network processing system 100 also performs contextual analysis of the image to determine an approximate position of the activity in the image.

Once a new image is published to the social network site, such as by the user 102, the social network processing system 100 identifies a field of view and a location of capture of the new image and identifies various stored activities associated with the location captured by the image. The social network processing system 100 then overlays appropriate image objects over the approximate location on the image where the activity occurred.

The images from other users 104 in the social network could also be used to add points of interest (POI) along navigation routes so the POI would appear if any of the users 104 were driving a similar route.

The social network processing system 100 creates overlaid objects with hotspots that link to the images from the social network site. The social network processing system 100 may also show additional information about the activity related image object.

The social network processing system 100 may overlay animated activity related image objects over any image to explain the sequence of activities that a user (e.g., the user 102) performed. For example, in any place one user (e.g., the user 102) enjoyed boating and then parasailing. So once any other user (e.g., any of the users 104) views the image, the activity related image object related to boating is overlaid first and the activity related image object related to parasailing is overlaid second.

According to aspects of the present disclosure, the social network processing system 100 may implement the following steps. Once any photograph (i.e., image or image data) is published in social network site, then the social network processing system 100 may extract: metadata of the image (i.e., location, time, direction, field of view of the capture, etc.); the user who published the image; and different objects from the image which are related to an action/activity (e.g., fishing, driving, boating, driving, capturing a photograph, etc.). The social network processing system 100 may extract any such image object that is available in the image.

The extracted image objects may be analyzed contextually to determine the name of the activity, and, based on the time, location, the social network processing system 100 may identify a sequence of activity of any user. The social network processing system 100 may also identify the relative position of the activity image from the photograph, for example, para-gliding image object is seen at the corner of a mountain (e.g., as illustrated in FIG. 2B).

The social network processing system 100 may also extract the text associated to the image, and, based on a contextual analysis, the social network processing system 100 may identify the associated activity. Based on contextual analysis of the text data, the social network processing system 100 may identify the appropriate location of the activity in the image.

Once a new image is published in social network site, the social network processing system 100 may extract location, direction, and field of view information and then identify available performed activities by various friends of the user. Once related activities are identified, then the social network processing system 100 may identify relative position of the activities objects in the captured images and overlay icons, text, or other indicia over the image.

A user can select the image object and accordingly can identify the original image from the user's connections and the performed activities. The social network processing system 100 may overlay animated activity sequence based on gathered action data from any selected friend's image (e.g. first boating, second para-gliding, etc.). The user can select the overlaid object to begin communication with that social network connection and begin to search for activities matching the object. For instance, a para-gliding image would search for local businesses in the geographic area that offer para-gliding.

Figure 2A:
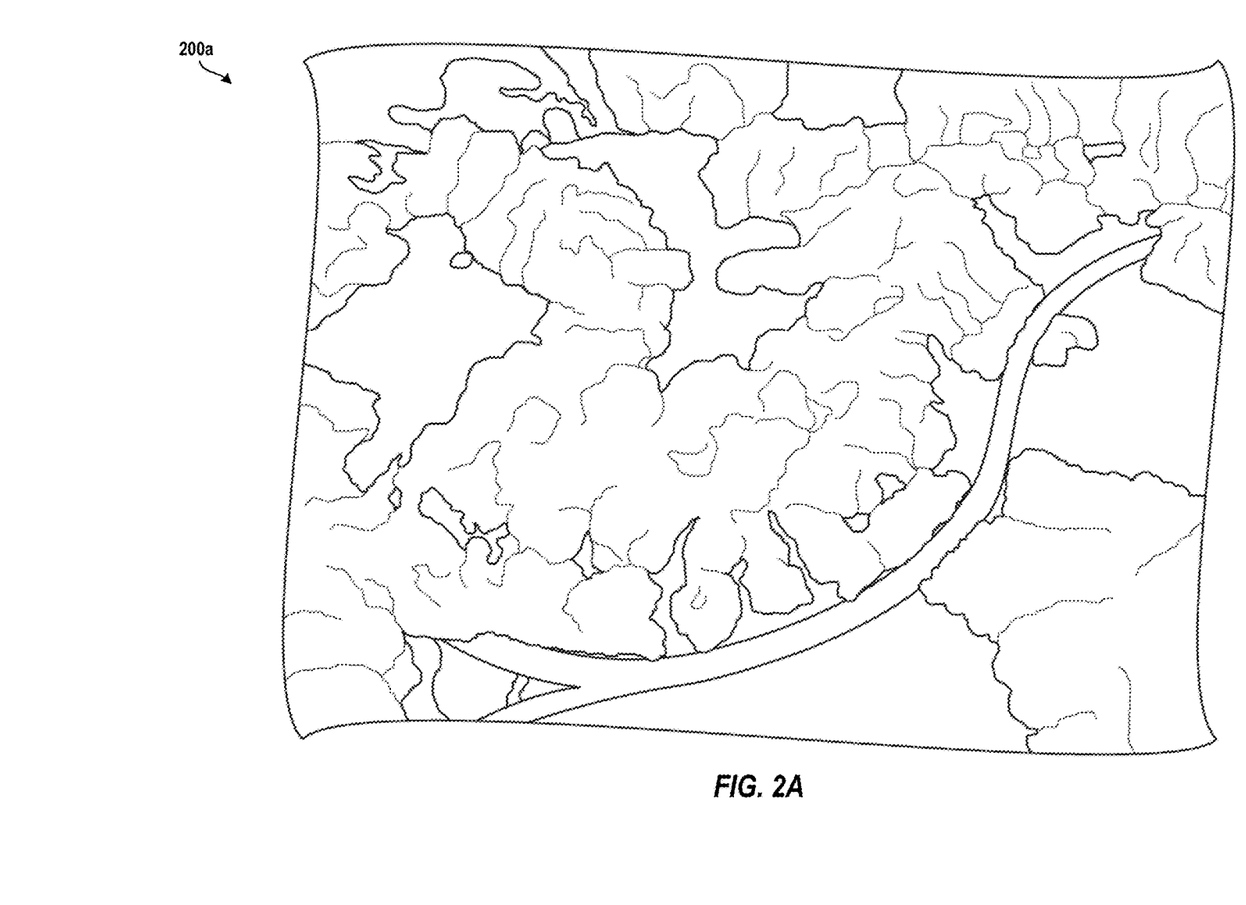
FIG. 2A illustrates an image that the user of FIG. 1 uploaded to a social network site according to aspects of the present disclosure.
Figure 2B:
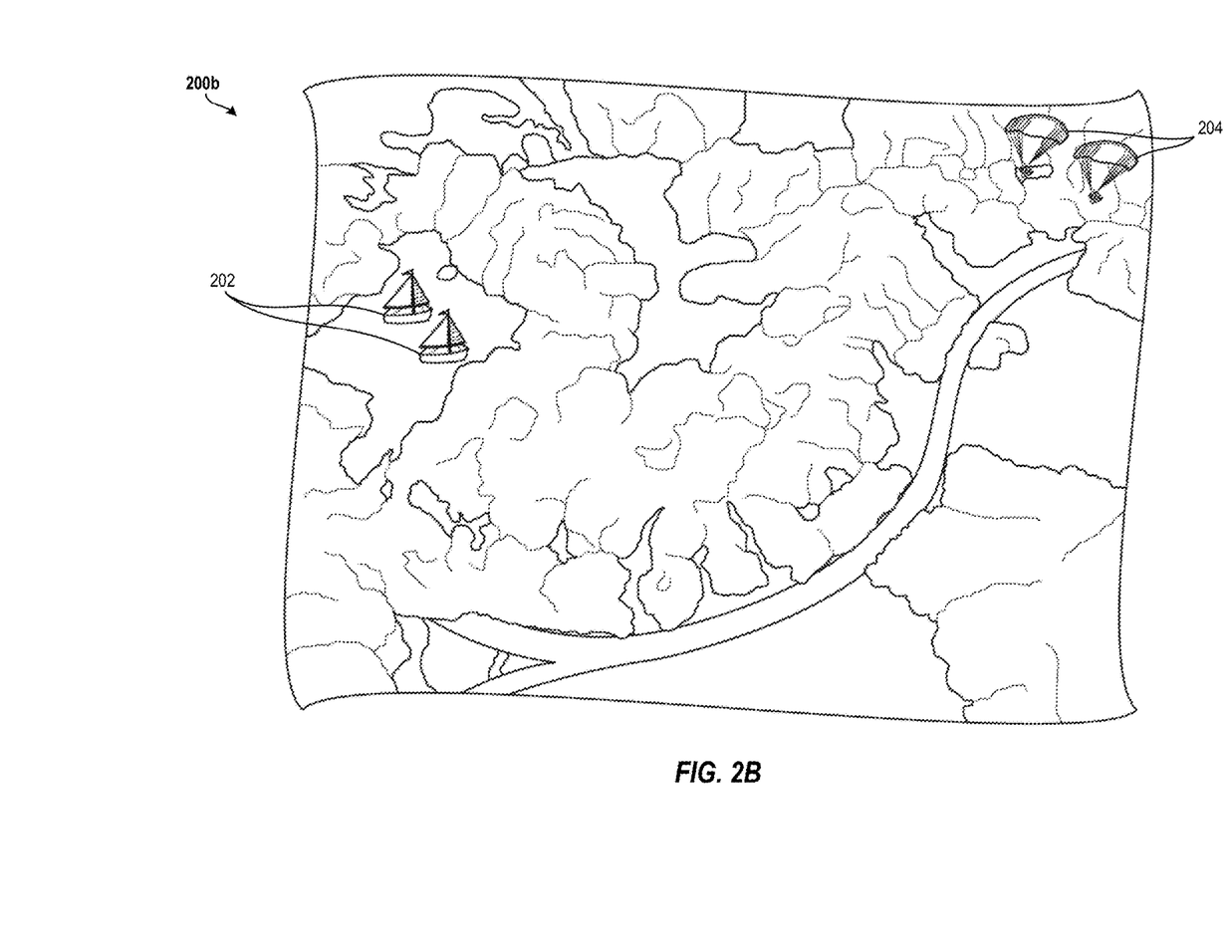
FIG. 2B illustrates the image of FIG. 2A including an overlay of an activity related image object according to aspects of the present disclosure.

FIG. 2A illustrates an image 200 that the user 102 of FIG. 1 uploaded to a social network site according to aspects of the present disclosure. A processing system analyzes the image 200 and identifies whether a user connected to the uploading user (a "connected user") (e.g., one of the users 104) has travelled to the location in the image 200 and what activities the connected user has done. The information can be extracted based on image analysis and exchangeable image file format (Exif) data contained in the image 200 or other metadata contained in the image 200. For example, if the connected user boated in that location, the a boating image may be extracted from another image or from an image database and can be overlaid in the approximate place where they were boating occurred as illustrated in FIG. 2B.

In particular, FIG. 2B illustrates the image 200 including an overlay of an activity related image object according to aspects of the present disclosure. Appropriate image objects 202, 204 can be overlaid over the image 200. The uploading user can also apply different filters related to friends/connections, circles, action/activity type, etc. The animated overlaid information on the image may also explain a travel story of a selected connected user.

Figure 3:
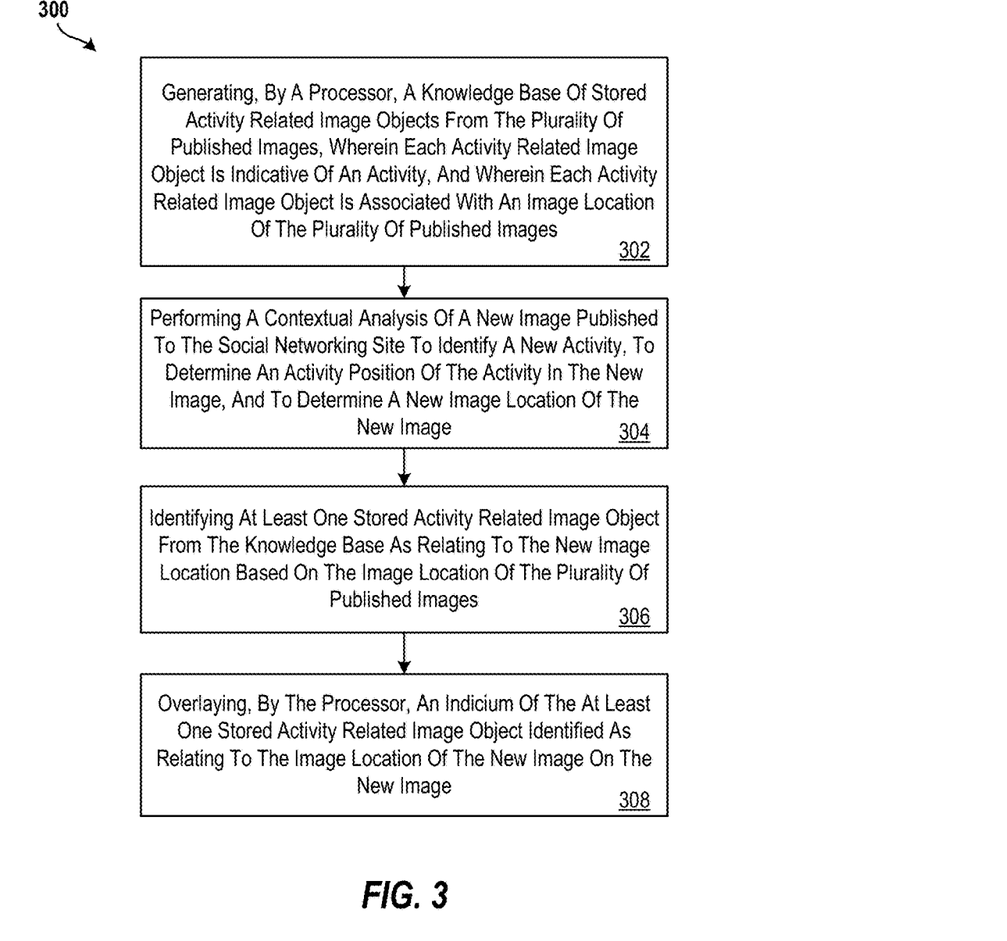
FIG. 3 illustrates a flow diagram of a method for extracting information from a plurality of images published to a social network site according to aspects of the present disclosure.

FIG. 3 illustrates a flow diagram of a method 300 for extracting information from a plurality of images published to a social network site according to examples of the present disclosure. The method 300 may be performed, for example, by a processing system, such as the social network processing system 100 of FIG. 1, the processing system 20 of FIG. 4, or by another suitable processing system.

At block 300, the method 300 includes generating, by a processor, a knowledge base of stored activity related image objects from the plurality of published images, wherein each activity related image object is indicative of an activity, and wherein each activity related image object is associated with an image location of the plurality of published images.

According to examples of the present disclosure generating the knowledge base may further include, identifying, by the processor, the plurality of published images from a plurality of user profiles. According to additional examples, generating the knowledge base may further include extracting, by the processor, activity related image objects from the plurality of published images. According to additional examples, generating the knowledge base may further include generating, by the processor, a correlation between the activity related image objects and the image location of the plurality of published images. According to additional examples, generating the knowledge base may further include performing, by the processor, a contextual analysis of data relating to the plurality of published images to identify the activities and to identify the image location. According to additional examples, generating the knowledge base may further include storing, by the processor, the activity related image objects as stored activity related image objects in the knowledgebase.

At block 302, the method 300 includes performing a contextual analysis of a new image published to the social network site to identify a new activity, to determine an activity position of the activity in the new image, and to determine a new image location of the new image.

At block 304, the method 300 includes identifying at least one stored activity related image object from the knowledge base as relating to the new image location based on the image location of the plurality of published images.

At block 306, the method 300 includes overlaying, by the processor, an indicium of the at least one stored activity related image object identified as relating to the image location of the new image on the new image. According to examples of the present disclosure, the indicium may be overlaid on the new image at the activity position (e.g., approximately where the activity occurred). The indicium may include text describing the activity, an icon relating to the new activity, and/or a hyperlink that provides information about the new activity. For example, the indicium may be a sailboat icon if the activity is sailing, and the sailboat icon may direct the user to a website for a sailing excursion company located near the activity position.

Additional processes also may be included, and it should be understood that the processes depicted in FIG. 3 represent illustrations, and that other processes may be added or existing processes may be removed, modified, or rearranged without departing from the scope and spirit of the present disclosure.

Figure 4:
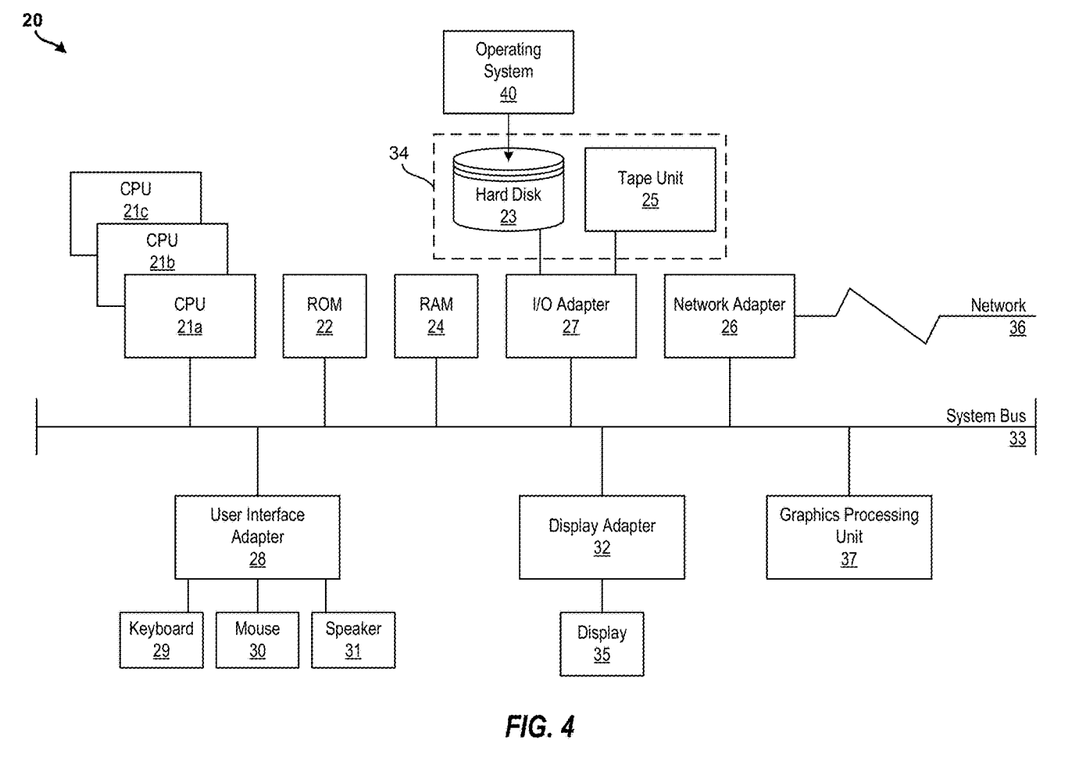
FIG. 4 illustrates a block diagram of a processing system for implementing the techniques described herein according to aspects of the present disclosure.

It is understood in advance that the present disclosure is capable of being implemented in conjunction with any other type of computing environment now known or later developed. For example, FIG. 5 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for organizing information of a plurality of images published to a network site, the method comprising:
generating, by a processor, a knowledge base of stored activity related image objects from the plurality of published images, wherein each activity related image object is indicative of an activity, and wherein each activity related image object is associated with an image location of the plurality of published images;
performing a contextual analysis of a new image published to the network site to identify new activities, to determine an activity position of the activities in the new image, and to determine a new image location of the new image;
identifying at least two stored activity related image objects from the knowledge base as relating to the new image location based on the image location of the plurality of published images; and
overlaying, by the processor, an indicium of the at least two stored activity related image objects identified as relating to the image location of the new image on the new image at the activity position of the activities in the new image, the indicium being an animation of the at least two stored activity related image objects displayed sequentially to depict a sequence of activities.

2. The computer-implemented method of claim 1, wherein the indicium comprises text describing at least one of the new activities.

3. The computer-implemented method of claim 1, wherein the indicium comprises an icon relating to at least one of the new activities.

4. The computer-implemented method of claim 1, wherein the indicium comprises a hyperlink to a website that provides information about at least one of the new activities.

5. The computer-implemented method of claim 1, wherein generating the knowledge base further comprises identifying, by the processor, the plurality of published images from a plurality of user profiles.

6. The computer-implemented method of claim 1, wherein generating the knowledge base further comprises extracting, by the processor, activity related image objects from the plurality of published images.

7. The computer-implemented method of claim 1, wherein generating the knowledge base further comprises generating, by the processor, a correlation between the activity related image objects and the image location of the plurality of published images.

8. The computer-implemented method of claim 1, wherein generating the knowledge base further comprises performing, by the processor, a contextual analysis of data relating to the plurality of published images to identify the activity and to identify the image location.

9. The computer-implemented method of claim 1, wherein generating the knowledge base further comprises storing, by the processor, the activity related image objects as stored activity related image objects in the knowledge base.

10. A system for organizing information of a plurality of images published to a network site, the system comprising:
a memory comprising computer readable instructions; and
a processing device for executing the computer readable instructions for performing a method, the method comprising:
generating a knowledge base of stored activity related image objects from the plurality of published images, wherein each activity related image object is indicative of an activity, and wherein each activity related image object is associated with an image location of the plurality of published images;
performing a contextual analysis of a new image published to the network site to identify new activities, to determine an activity position of the activity in the new image, and to determine a new image location of the new image;
identifying at least two stored activity related image objects from the knowledge base as relating to the new image location based on the image location of the plurality of published images; and
overlaying an indicium of the at least two stored activity related image objects identified as relating to the image location of the new image on the new image at the activity position of the activities in the new image, the indicium being an animation of the at least two stored activity related image objects displayed sequentially to depict a sequence of activities.

11. The system of claim 10, wherein the indicium comprises text describing at least one of the new activities.

12. The system of claim 10, wherein the indicium comprises an icon relating to at least one of the new activities.

13. The system of claim 10, wherein the indicium comprises a hyperlink to a website that provides information about at least one of the new activities.

14. The system of claim 10, wherein generating the knowledge base further comprises identifying, by the processing device, the plurality of published images from a plurality of user profiles.

15. The system of claim 10, wherein generating the knowledge base further comprises extracting, by the processing device, activity related image objects from the plurality of published images.

16. The system of claim 10, wherein generating the knowledge base further comprises generating, by the processing device, a correlation between the activity related image objects and the image location of the plurality of published images.

17. The system of claim 10, wherein generating the knowledge base further comprises performing, by the processing device, a contextual analysis of data relating to the plurality of published images to identify the activity and to identify the image location.

18. A computer program product for organizing information of a plurality of images published to a network site, the computer program product comprising:

a computer readable storage medium having program instructions embodied therewith, wherein the computer readable storage medium is not a transitory signal per se, the program instructions executable by a processing device to cause the processing device to perform a method comprising:

generating a knowledge base of stored activity related image objects from the plurality of published images, wherein each activity related image object is indicative of an activity, and wherein each activity related image object is associated with an image location of the plurality of published images;

performing a contextual analysis of a new image published to the network site to identify new activities, to determine an activity position of the activities in the new image, and to determine a new image location of the new image;

identifying at least two stored activity related image objects from the knowledge base as relating to the new image location based on the image location of the plurality of published images; and overlaying an indicium of the at least two stored activity related image objects identified as relating to the image location of the new image on the new image at the activity position of the activities in the new image, wherein the activity position is indicative of a location where the activities occurred in the new image, the indicium being an animation of the at least two stored activity related image objects displayed sequentially to depict a sequence of the activities.

* * * * *